United States Patent
Padia et al.

(10) Patent No.: US 9,483,188 B2
(45) Date of Patent: *Nov. 1, 2016

(54) MULTIPLE I/O REQUEST PROCESSING IN A STORAGE SYSTEM

(71) Applicant: International Business Machines Corporation, Armonk, NY (US)

(72) Inventors: Praveen K. Padia, Sunnyvale, CA (US); Rohit Shekhar, Sunnyvale, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/042,408

(22) Filed: Feb. 12, 2016

(65) Prior Publication Data

US 2016/0162188 A1    Jun. 9, 2016

Related U.S. Application Data

(63) Continuation of application No. 14/821,861, filed on Aug. 10, 2015, now Pat. No. 9,292,209, which is a continuation of application No. 13/221,469, filed on Aug. 30, 2011, now Pat. No. 9,134,909.

(51) Int. Cl.
G06F 3/06       (2006.01)
G06F 13/10      (2006.01)
H04L 29/08      (2006.01)

(52) U.S. Cl.
CPC .............. *G06F 3/061* (2013.01); *G06F 3/067* (2013.01); *G06F 3/0613* (2013.01); *G06F 3/0655* (2013.01); *G06F 3/0659* (2013.01); *G06F 13/102* (2013.01); *H04L 67/1097* (2013.01)

(58) Field of Classification Search
None
See application file for complete search history.

(56) References Cited

U.S. PATENT DOCUMENTS

| | | |
|---|---|---|
| 6,389,478 B1 | 5/2002 | Blackmore et al. |
| 6,721,334 B1 | 4/2004 | Ketcham |
| 6,920,125 B1 | 7/2005 | Wu |
| 7,526,593 B2 | 4/2009 | Mandal et al. |
| 7,535,842 B1 | 5/2009 | Venables et al. |
| 9,134,909 B2 | 9/2015 | Padia et al. |

(Continued)

FOREIGN PATENT DOCUMENTS

WO    0072532 A1    11/2000

OTHER PUBLICATIONS

Petersen, "Linux Data Integrity Extensions," Reprinted from the Proceedings of the Linux Symposium, Jul. 23-26, 2008, Ottawa, Ontario, Canada, Jul. 23-26, 2008, pp. 151-156.
Gibson, "Storage Thoughts," Storage Thoughts: A Weblog of Thoughts on Comoputer Storage Technology, http://storagethoughts.blogspot.com/2006/08/performance-blocks-vs-nas.html, Aug. 14, 2006, 2 pages.

(Continued)

*Primary Examiner* — Idriss N Alrobaye
*Assistant Examiner* — Dayton Lewis-Taylor
(74) *Attorney, Agent, or Firm* — Randall J. Bluestone; Erik K. Johnson

(57) ABSTRACT

A mechanism is provided to optimize performance of a storage system. A plurality of I/O requests is received. A subset of the plurality of I/O requests is selected. The size of each I/O request of the subset of the plurality of I/O requests is less than a predetermined size, but the combined size of the subset of the plurality of I/O requests is greater than the predetermined size. Furthermore, the subset of the plurality of I/O requests is associated with a single logical unit number. A data transfer command which includes the subset of the plurality of I/O requests is generated. The data transfer command is transmitted.

5 Claims, 9 Drawing Sheets

(56) References Cited

U.S. PATENT DOCUMENTS

| | | |
|---|---|---|
| 2008/0126641 A1 | 5/2008 | Irish et al. |
| 2009/0073884 A1 | 3/2009 | Kodama et al. |
| 2010/0161936 A1 | 6/2010 | Royer et al. |
| 2012/0221767 A1 | 8/2012 | Post et al. |
| 2015/0347035 A1 | 12/2015 | Padia et al. |

OTHER PUBLICATIONS

Nemeth et al., "Linux Administration Handbook: Second Edition," Pearson Education, Inc., USA, copyright 2007, first printed in Stoughton, MA, USA, Oct. 2006, p. 115.

USPTO, "Evaluating Subject Matter Eligibility Under 35 USC 101: Aug. 2012 Update," www.uspto.gov/sites/default/files/patents/law/exam/101_training_aug2012.pdf, pp. 1-73.

MULTIPLE I/O REQUEST PROCESSING IN A STORAGE SYSTEM

BACKGROUND

The disclosure relates generally to non-volatile memory access, and more specifically to multiple I/O request processing in a storage system.

Commercially available storage systems include large numbers of hard disk drives operating under various control mechanisms to record, mirror, remotely backup, and reproduce data. The rapidly growing amount of data requires companies to manage the data carefully with their information technology systems, and to assure appropriate performance within such systems.

Communication between host applications and storage systems is limited by the bandwidth of the storage system and the network bandwidth. The total bandwidth of the storage system is defined by a throughput capability and a response time capability. Throughput is a measure of the rate of speed at which the storage system can deliver data. Throughput can be expressed as a data rate in terms of gigabytes delivered per second (GB/sec). The performance of a storage system can also be expressed in terms of Input/Output(I/O) request processing rate per seconds (IOPS).

Transmission Control Protocol over Internet Protocol (TCP/IP) is a common network protocol used by the Internet. The internet Small Computer Systems Interface (iSCSI) transport protocol is a standard which defines one approach for accessing and transporting data over commonly utilized communications networks. Using the iSCSI command and instruction set, conventional Small Computer Systems Interface (SCSI) commands, typically associated with communication within locally maintained storage devices, may be encapsulated in a network-compatible protocol wrapper allowing SCSI communication between devices in a remote manner.

Running over layers of the TCP/IP protocol suite, iSCSI communication in the aforementioned manner is a computationally intensive process. The principal components of this process can be subdivided into: header processing, protocol processing, and data movement. Header processing includes parsing of packet headers at various layers of the protocol, extracting relevant information from headers, updating information as needed, performing tasks implied by the contents of the headers, creating headers for outgoing packets, and other related tasks. Protocol processing steps may include performing connection setups and teardowns, generating acknowledgements with protocol-dependent parameters, and maintaining timers. Data movement refers to storing and retrieving data.

Different applications can possess diverse I/O patterns and can be represented by specifically formulated workloads. I/O workloads are used to represent specific I/O demands of some applications. In general, applications are characterized as either requiring high throughput or fast response time. A high GB/sec is associated with applications which generate fewer I/O requests but demand large amounts of data. A fast response time is associated with applications which generate short requests (for example, online transaction applications). Typically, in order to facilitate better throughput or better IOPS, it is desirable to use as large a packet size as possible to reduce overhead associated with transmitting, receiving and processing data that is stored in the storage system.

SUMMARY

In one illustrative embodiment, a method for optimizing performance of a storage system is provided. The method comprises a first processor receiving a plurality of I/O requests. The method further comprises the first processor selecting a subset of the plurality of I/O requests. The size of each I/O request of the subset of the plurality of I/O requests is less than a predetermined size, but the combined size of subset of the plurality of I/O requests is greater than the predetermined size. Furthermore, the subset of the plurality of I/O requests is associated with a single logical unit number. The method further comprises the first processor generating a data transfer command comprising the subset of the plurality of I/O requests. The method further comprises the first processor transmitting the data transfer command to a second processor.

In another illustrative embodiment, a computer program product for optimizing performance of a storage system is provided. The computer program product comprises one or more computer-readable tangible storage medium and program instructions stored on at least one of the one or more computer-readable tangible storage medium. The computer-readable tangible storage medium comprises program instructions to receive a plurality of I/O requests. The computer-readable tangible storage medium further comprises program instructions to select a subset of the plurality of I/O requests. The size of each I/O request of the subset of the plurality of I/O requests is less than a predetermined size, but the combined size of subset of the plurality of I/O requests is greater than the predetermined size. Furthermore, the subset of the plurality of I/O requests is associated with a single logical unit number. The computer-readable tangible storage medium further comprises program instructions to generate a data transfer command comprising the subset of the plurality of I/O requests. The computer-readable tangible storage medium further comprises program instructions to transmit the data transfer command.

In another illustrative embodiment, a computer system for optimizing performance of a storage system is provided. The computer system comprises one or more processors, one or more computer-readable memories, one or more computer-readable tangible storage medium, and program instructions stored on at least one of the one or more storage medium for execution by at least one of the one or more processors via at least one of the one or more memories. The computer-readable tangible storage medium comprises program instructions to receive a plurality of I/O requests. The computer-readable tangible storage medium further comprises program instructions to select a subset of the plurality of I/O requests. The size of each I/O request of the subset of the plurality of I/O requests is less than a predetermined size, but the combined size of subset of the plurality of I/O requests is greater than the predetermined size. Furthermore, the subset of the plurality of I/O requests is associated with a single logical unit number. The computer-readable tangible storage medium further comprises program instructions to generate a data transfer command comprising the subset of the plurality of I/O requests. The computer-readable tangible storage medium further comprises program instructions to transmit the data transfer command.

DETAILED DESCRIPTION

The following provides a high level overview of the iSCSI protocol. The present invention is not limited to the iSCSI protocol. The discussion below is intended only to be illustrative, and not limiting on the invention. This discussion provides a brief background to illustrate certain basic features and concepts of the SCSI architecture, other documents are available to provide a more detailed discussion. For example, the current evolving SCSI standard is described in a document titled "SCSI Architecture Model-2 (SAM-2)," produced by T10, Technical Committee of the National Committee on Information Technology Standards.

At a high level, SCSI is a family of interfaces for requesting services from I/O devices, including hard drives, printers, and scanners. In SCSI parlance, an individual I/O device, such as a storage device, is called a "logical unit" (LU). SCSI is a client-server architecture.

Figure 1A:
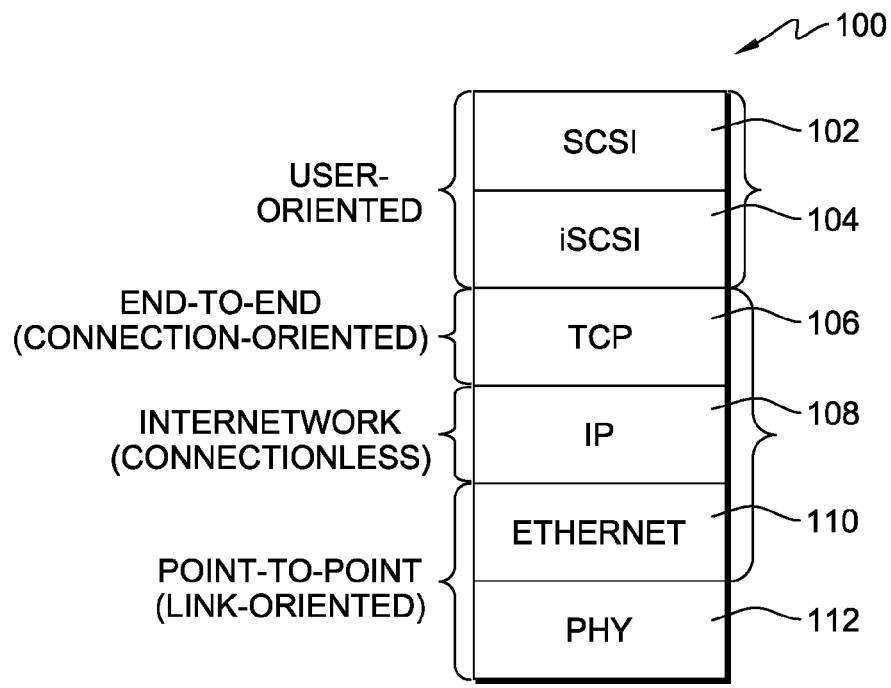
FIGS. 1A and 1B provide an overview of data storage networking and iSCSI protocol in the context of an illustrative embodiment.
Figure 1B:
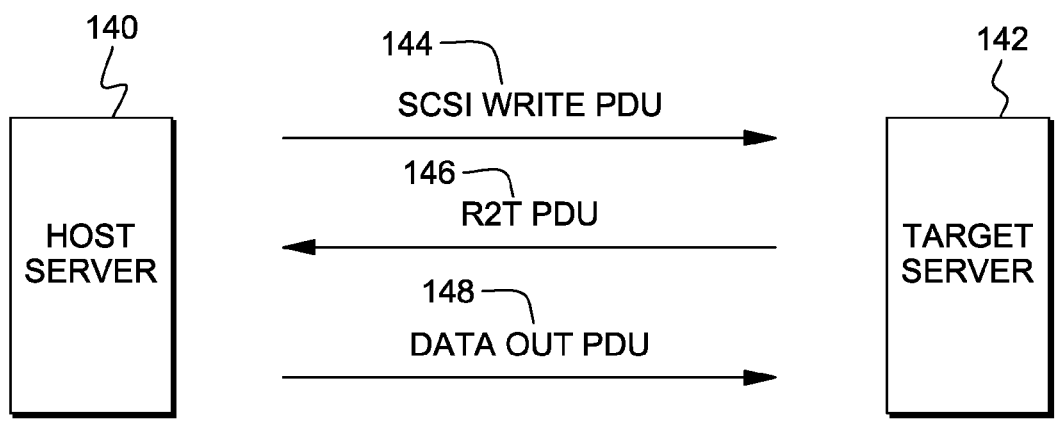

Communication between SCSI components can occur over several layers of networking protocols. FIGS. 1A and 1B provide an overview of an exemplary storage networking and the iSCSI protocol in the context of an exemplary data storage system. As shown in FIG. 1A, the layering of protocols for a network storage system is described in terms of the Open System Interconnect (OSI) model 100. According to model 100, storage networking and communication generally follow a layered, or hierarchical approach, wherein a plurality of layers exist to perform selected functions related to the processing of information.

The principal layers of the storage networking model 100, also known as a network stack, include a SCSI layer 102, an iSCSI layer 104, a TCP layer 106, an IP layer 108, an Ethernet layer 110, and a physical layer 112. SCSI layer 102 implements the SCSI command set wherein storage data operations to SCSI devices are performed and managed. iSCSI layer 104 is responsible for transmitting and receiving SCSI commands over a TCP/IP based network. In various embodiments, iSCSI layer 104 transports SCSI I/O over an IP network through the use of iSCSI protocol data units (PDUs), the composition of which is illustrated below in FIGS. 2A and 2B.

TCP layer 106 serves as the principal end-to-end network protocol and is typically used for establishing a reliable (connection-oriented) session between sending and receiving devices. iSCSI PDUs, contained in TCP segments, are transmitted as TCP data. IP layer 108 serves as connectionless service that is typically used to route data and information between network devices. Ethernet layer 110 serves as the media access control protocol handler to transfer Ethernet frames across the physical link (for example, physical network connection/layer). Physical layer 112 defines physical medium itself (for example, physical cable or connection type) and provides the electrical and mechanical means to maintain the physical link between systems. SCSI layer 102 and part of iSCSI layer 104 processing generally occur at a software level whereas part of iSCSI layer 104, TCP layer 106, IP layer 108, and Ethernet layer 110 processing occur at a hardware level.

It should be noted that as data traverses through the networking layers described above, each networking layer attaches its own header, which is typically fixed in size. Hence, if data packets are transmitted in smaller units of size, the overhead associated with networking layers would be higher. Generally, such overhead wastes significant portion of network bandwidth in just transmitting, receiving and processing headers of different network layers. For example, if a network bandwidth is 1 GB and the combined header size is 1 MB (for all network layers), one can transmit 1023 MB of data as a single packet. Alternatively, if the same data is divided into smaller packets (for example, 1 MB packets), with the same network bandwidth one can transmit only 512 MB of data, as the other 512 MB will be occupied by overhead associated with different network layers shown in FIG. 1A. This example illustrates that the larger packet size enables one to transmit more application data and thus gives a better throughput to a data storage system. If the same data is divided into smaller packets, the storage system needs to process more packets to perform the same job (thus consuming more CPU).

FIG. 1B illustrates a high level client server model of information exchange between a host server 140 and a target server 142. Host server 140 can encapsulate a SCSI write command in a SCSI write PDU 144 that may be transmitted from host server 140 to target server 142. Upon receipt of SCSI write PDU 144, target server 142 may respond with an acknowledgment signal comprising a ready to transmit (R2T) PDU 146. The information contained in R2T PDU 146 serves as a signal to host server 140 that target server 142 is ready to receive information and determines when host server 140 will commence with data transmission in the form of one or more data out PDUs 148.

Figure 2A:
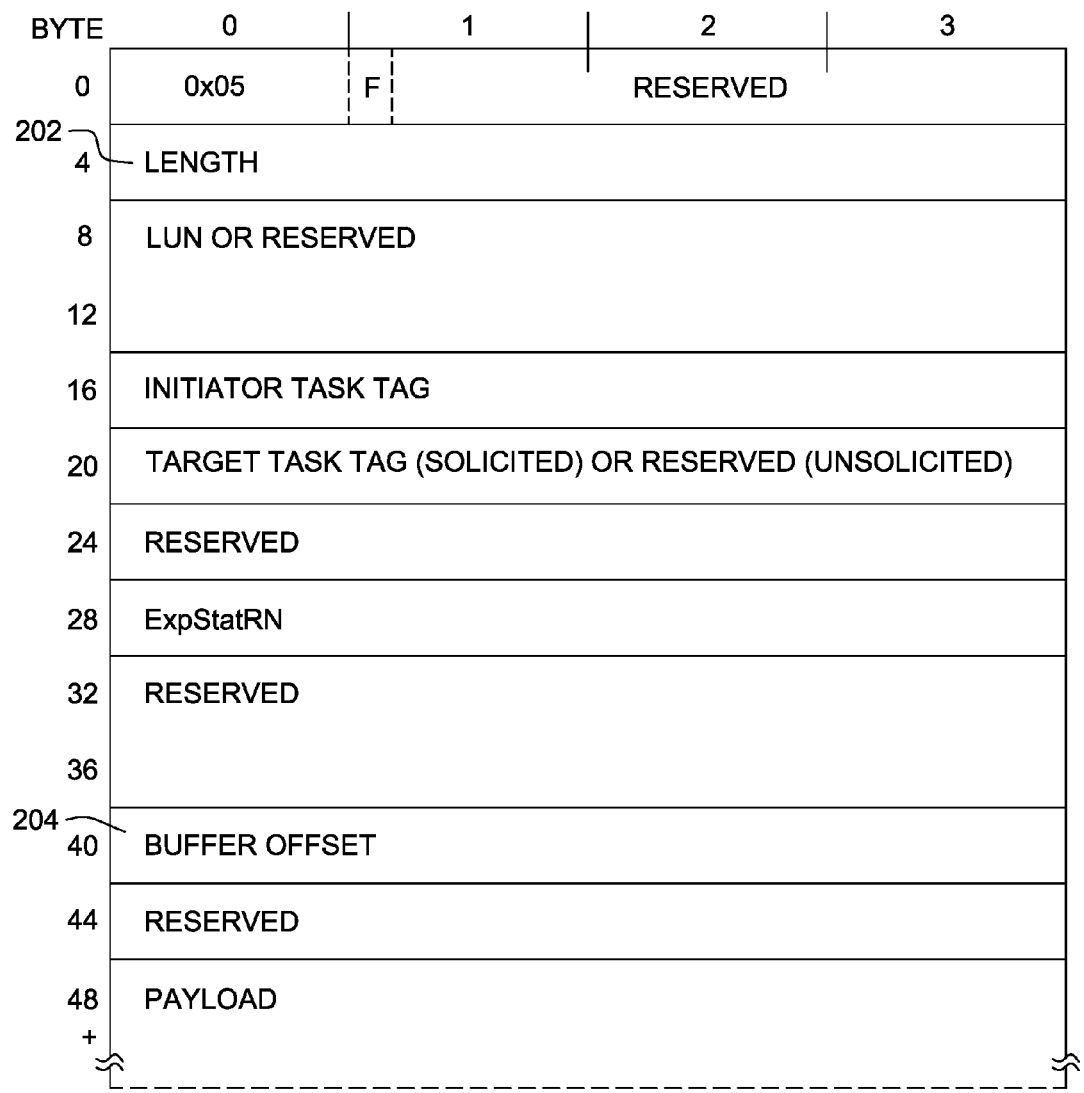
FIGS. 2A and 2B are exemplary diagrams, which depict the packet formats for SCSI data transfer commands.
Figure 2B:
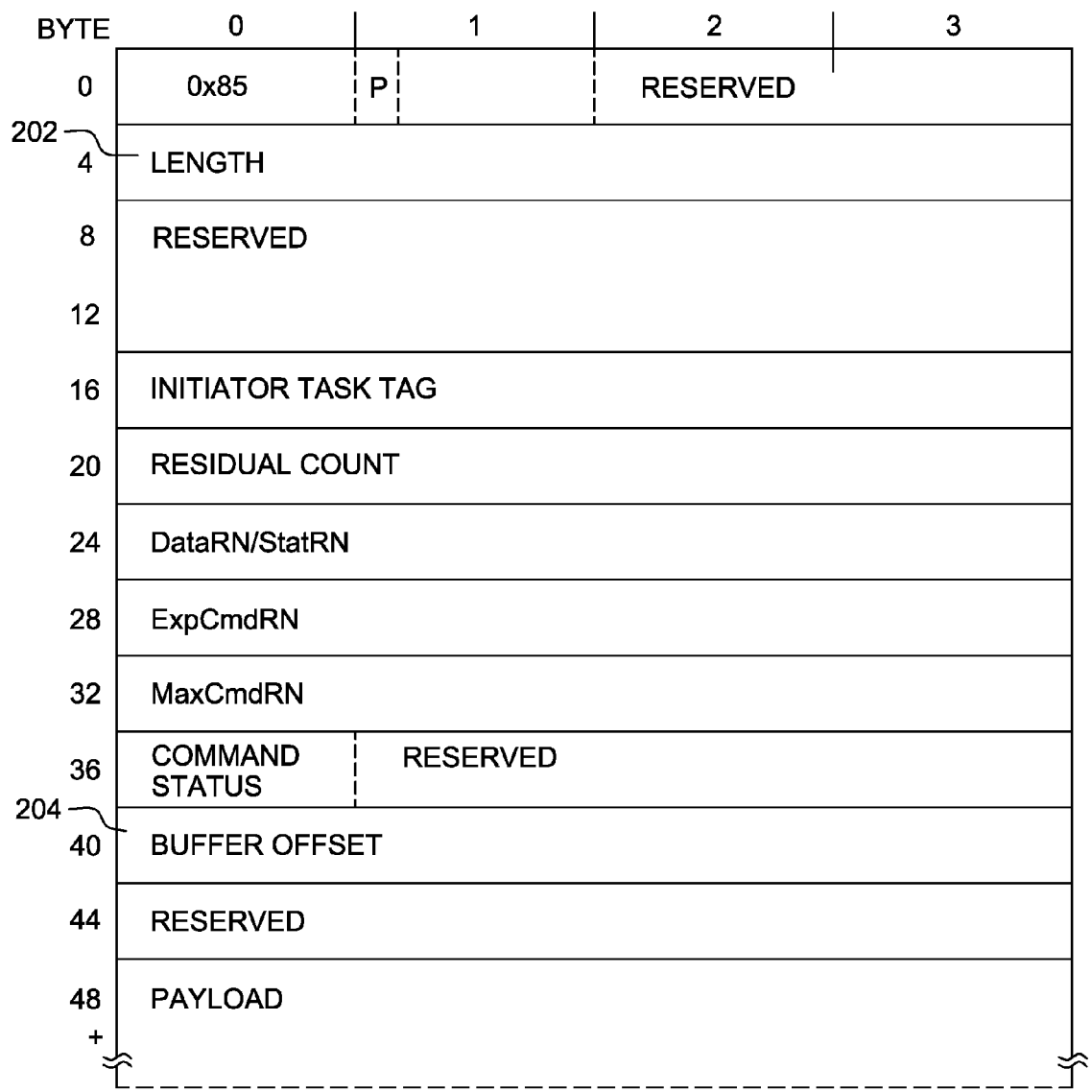

FIGS. 2A and 2B illustrate details of the composition of exemplary iSCSI PDU packet formats for SCSI data write (from host server 140 to target server 142) and read (from target server 142 to host server 140), respectively. These packet formats and their contents are known and documented As shown in FIGS. 2A and 2B, an iSCSI PDU comprising a SCSI command comprises a length field 202, the Logical Unit Number (LUN) associated with storage devices 340, 342, and 344, an offset field 204, and the like. The length field 202 specifies the total number of bytes in the following payload. The Buffer Offset field 204 contains the offset of the following data against the complete data transfer. The sum of the buffer offset and length should not exceed the expected transfer length for the command. Other commands and details regarding the proposed iSCSI protocol are published and known by persons skilled in the art, and therefore need not be described herein in order to gain an understanding of the concepts and operation of the present invention. Indeed, the foregoing discussion has been provided merely for purposes of illustration, and is not deemed to be limiting upon the scope and spirit of the present invention.

Figure 3:
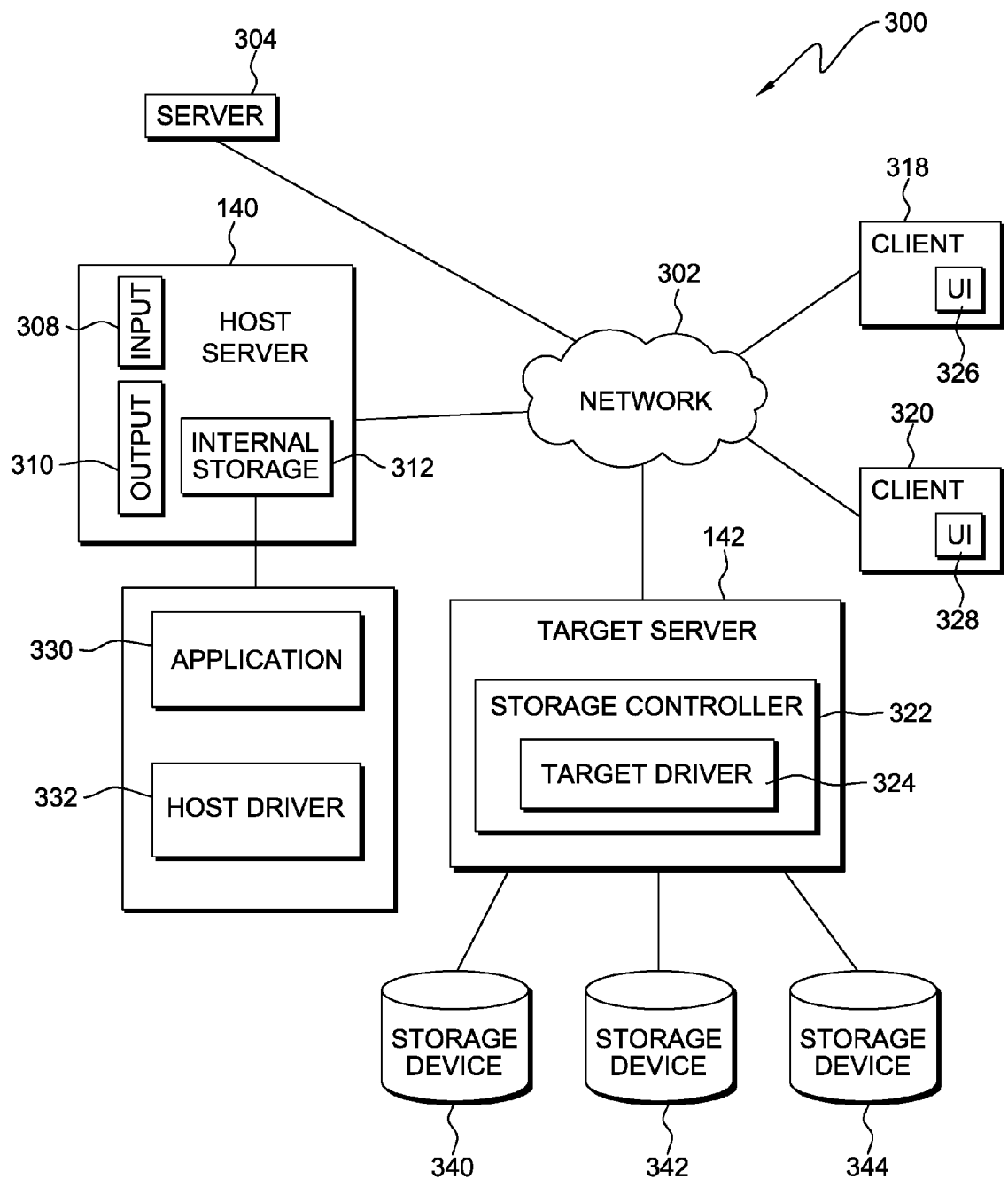
FIG. 3 is a block diagram of a sample computer network in which the present invention can be implemented.

FIG. 3 is a block diagram of a sample computer network 300 in which the present invention can be implemented. FIG. 3 is an illustration of one implementation and is not intended to imply any limitation with regard to the environments in which different embodiments may be implemented. Many modifications to the depicted environments may be made.

In one embodiment network 302 can be the Internet which uses the TCP/IP suite of protocols. Network 302 may also comprise a number of different types of networks, such as an intranet, a local area network (LAN), or a wide area network (WAN).

Network 302 provides communications links between various devices and computers. Network 302 may include connections, such as wire, wireless communication links, fiber optic cables, or any other connection technology known in the art.

Client computers 318 and 320 connect to network 302. Client computers 318 and 320 may be, for example, mobile devices, telephones, television receivers, cell phones, personal digital assistants, netbooks, laptop computers, tablet computers, desktop computers, and/or any type of computing devices. Client computers 318 and 320 may contain user interfaces (UIs) 326 and 328, respectively. UIs 326 and 328 can be, for example, graphical user interfaces (GUIs) or web user interfaces (WUIs).

Server computer 304, host server computer 140, target server computer 142 and a plurality of storage units 340, 342, and 344 also connect to network 302. Network 302 may include additional server computers, client computers, displays and other devices not shown. Host server computer 140 is configured to communicate with storage devices 340, 342, and 344 through a host driver 332 and through target server 142 which runs a target driver 324. Host server computer 140 and target server computer 142 may be a workstation, a server, a mainframe computer, a personal computer, and the like. Host server computer 140 is responsive to at least one application 330. In one embodiment, host server 140 runs application 330. Host server computer 140 may service requests by clients 318 and 320 to application 330. In another embodiment, host server computer 140 acts as a server to another client 318 running application 330 and responds to requests from application 330 running on client 318. Host server computer 140 may contain an input device 308 and an output device 310.

Host server computer 140 connects to target server computer 142 to access storage devices 340, 342, and 344. Target server 142 may include an intermediary gateway server and storage controller 322. There may be many physical storage devices 340, 342, and 344 managed by the same target server 142. Each storage device 340, 342, and 344 may have a unique LUN associated with it.

Host server computer 140 includes host driver 332 configured to communicate with storage devices 340, 342, and 344 through target driver 324. In one embodiment, host driver 332 is a host SCSI driver and target driver 324 is a SCSI storage device driver. Host driver 332 typically receives data storage access requests from at least one application 330 and then sends SCSI commands and data to target driver 324, which is configured to communicate with storage devices 340, 342, and 344. Target driver 324 receives data and data access responses from storage devices 340, 342, and 344 and transmits the data and data access responses to application 330 that made a request through host driver 332. Data access responses may include error messages, data status information, storage device access status information, and the like.

Host driver 332 may comprise program instructions stored on one or more computer-readable tangible storage devices, which may include internal storage 312 on host server computer 140. Host driver 332 may be downloaded to a data storage system or other device for use. Data gathered, generated, and maintained for use by host driver 332 may be kept in internal storage 312 of host server computer 140.

Figure 4:
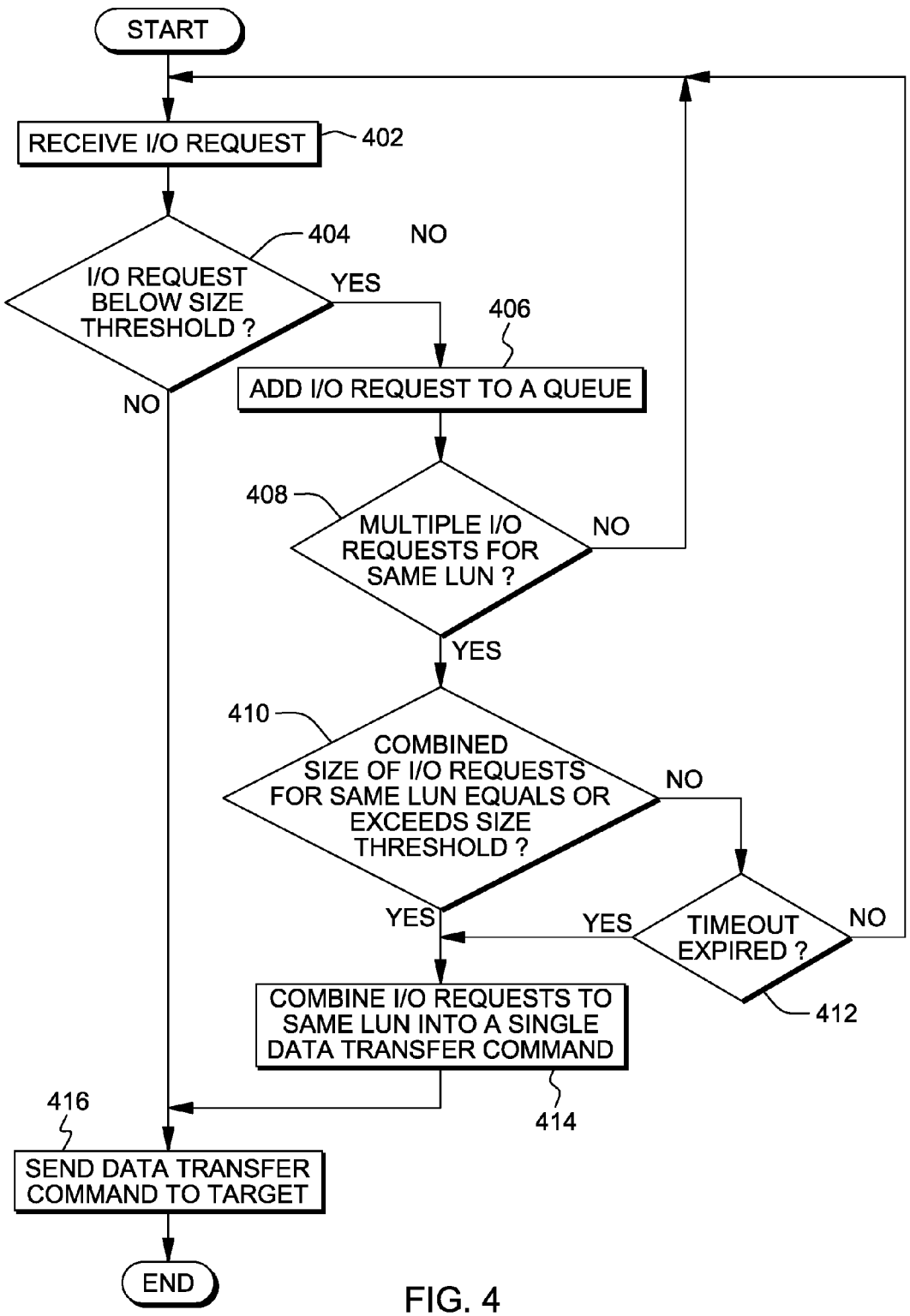
FIG. 4 is a flowchart of a method for combining a plurality of I/O requests performed by a host driver in accordance with an illustrative embodiment.

Turning now to FIG. 4, FIG. 4 is a flowchart of a method for combining a plurality of I/O requests performed by host driver 332 in accordance with an illustrative embodiment. At 402, host driver 332 waits for a plurality of I/O requests from application 330. At 404, host driver 302 examines all received I/O requests to determine whether the size of each I/O request is below a predetermined size threshold. As previously indicated, it may be desirable to combine a plurality of small-sized I/O requests into one data transfer command. In an embodiment, this size threshold may be a parameter configurable by a data storage system administrator and might depend on a network packet size. For example, the size of the IP packet is typically limited in size. In this exemplary embodiment the data storage system administrator may set the size threshold parameter to be equal 32 KB if the IP packet is limited to 64 KB. At 406, host driver 302 adds all I/O requests that are below the predetermined size to a wait queue based on the logical unit number to which the request is destined. At 408, host driver 332 checks the queue to determine whether there is a plurality of I/O requests with the same LUN destination and calculates the combined size for all such requests. If host driver 332 has not received a plurality of I/O requests with the same LUN destination that are below the predetermined size threshold, host driver 408 will wait for additional I/O requests (402).

At 410, host driver 332 determines whether the combined size of the plurality of I/O requests for the same LUN equals or exceeds the predetermined size threshold. If the combined size of the plurality of I/O requests for the same LUN is less than the predetermined threshold, host driver 332 will continue waiting for more I/O requests for a predetermined period of time. In an embodiment, host driver 332 may set up a timer associated with the wait queue. In other words, host driver 332 waits until the combined size of the received I/O requests with the same LUN destination equals or exceeds the predetermined size threshold or until the timer associated with the wait queue expires (412). At 414, host driver 332 generates a data transfer command by combining multiple I/O requests with the same LUN destination using, for example, a scatter/gather list, discussed further below in conjunction with FIG. 6. The term "scatter/gather list", as used herein, refers to a list of elements indicating the regions of memory to or from which data should be transferred. In an embodiment, such scatter/gather list may be embedded into a new SCSI level command to augment SCSI's current commands. At 416, host driver 332 transmits the command generated in 414 to target driver 324 by, for example, encapsulating the command into SCSI write PDU 144.

Figure 5:
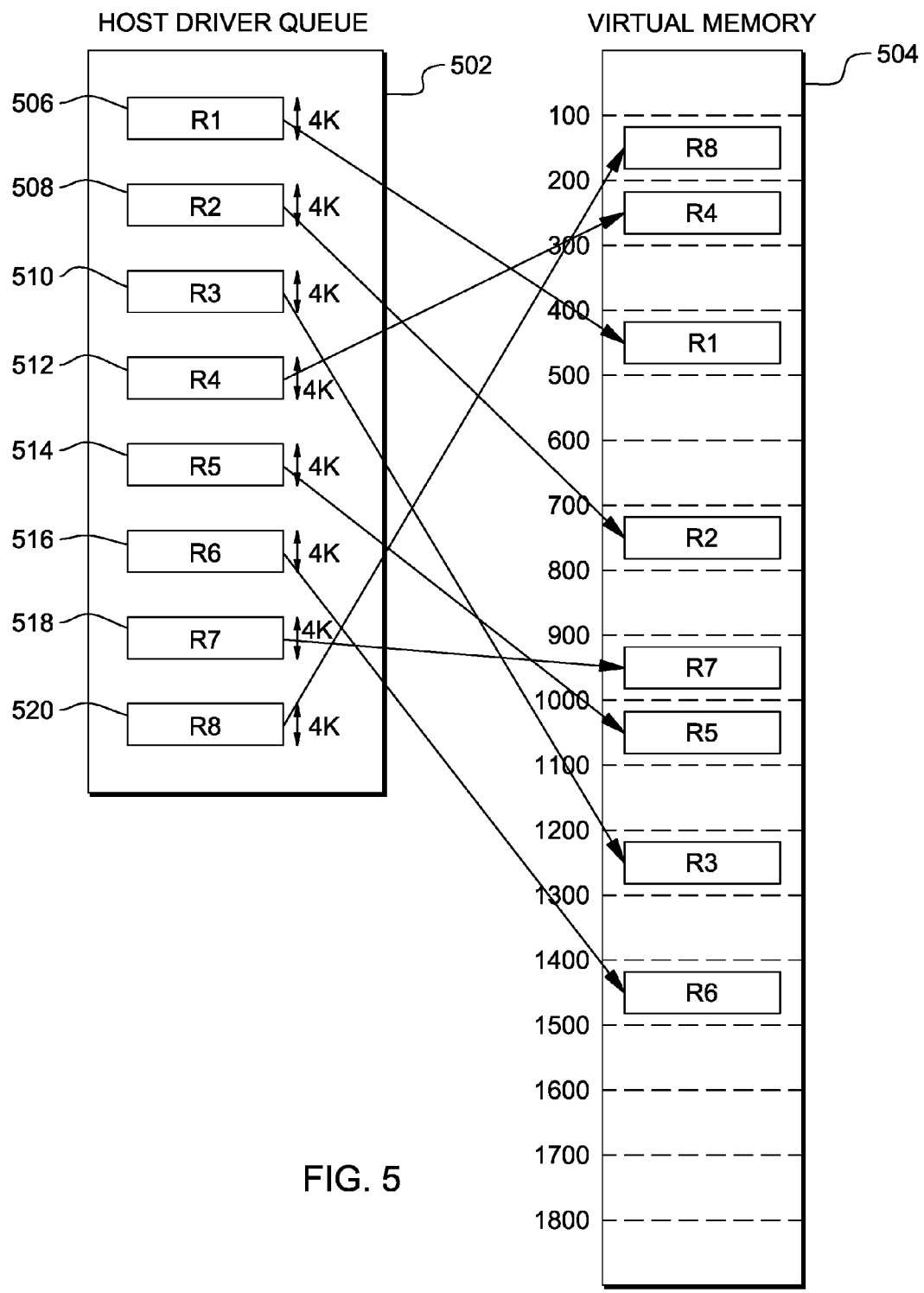
FIG. 5 is a diagram showing a plurality of I/O requests stored in a host driver queue.

FIG. 5 is a diagram showing an exemplary wait queue of I/O requests with the same LUN destination. For illustrative purposes, in one embodiment host driver 332 has generated the wait queue 502 shown in FIG. 5 by accumulating small-sized I/O requests with the same LUN destination in 406. In this example, wait queue 502 contains eight I/O requests, specifically $R_1$ 506, $R_2$ 508, $R_3$ 510, $R_4$ 512, $R_5$ 514, $R_6$ 516, $R_7$ 518, and $R_8$ 520, of equal size (4K). For illustrative purposes only, in one embodiment the pre-configured size threshold parameter is set to 32 KB. In this case, once host driver 332 makes a determination at 410 that the combined size of requests $R_1$ 506, $R_2$ 508, $R_3$ 510, $R_4$ 512, $R_5$ 514, $R_6$ 516, $R_7$ 518, and $R_8$ 520 (32 KB) equals or exceeds the predetermined threshold size, host driver 332 will generate a single data transfer command (416) by combining I/O requests $R_1$ 506 through $R_8$ 520. In some embodiments, where host driver 332 is configured to transfer a plurality of I/O requests through a new 16-byte long data transfer command, host driver 332 may utilize a scatter/gather list to embed information about each I/O request within a 16-byte command by using a parameter block. In at least one embodiment, at 414, host driver 332 calculates the length of the required data transfer and updates the PDU for a new SCSI command. Host driver 332 may calculate the length of the required data transfer T using the following formula:

$$T=P+\Sigma R_i,$$

where P is the length of the parameter block, discussed further below in conjunction with FIG. 6, and $\Sigma R_i$ represents the combined size of all I/O requests that will be transferred as one data transfer command. Furthermore, host driver 332 may calculate the length of the parameter block P, using the following formula:

$$P=(A+S)*N,$$

where A represents the size of the address field 618, S represents the size of the length field 622, and N is a number of I/O requests included in the command. For illustrative purposes, in one embodiment a new SCSI data transfer command accommodates an 8-byte long address field and 4-byte long data length field. In the example shown in FIG. 5 N is equal to 8, because there are 8 requests in the wait queue 502. Therefore, in this scenario, host driver 332 would calculate the parameter length P to be P=(8+4)*8=96 bytes. Consequently, host driver 332 would calculate the length of the required data transfer T to be T=96 bytes+32 KB.

After host driver 332 calculates a value of T, according to this embodiment, host driver 332 may set PDU length field 202 to a value of T calculated as described above. In addition, host driver 332 may set the buffer offset field 204 to 0.

Figure 6:
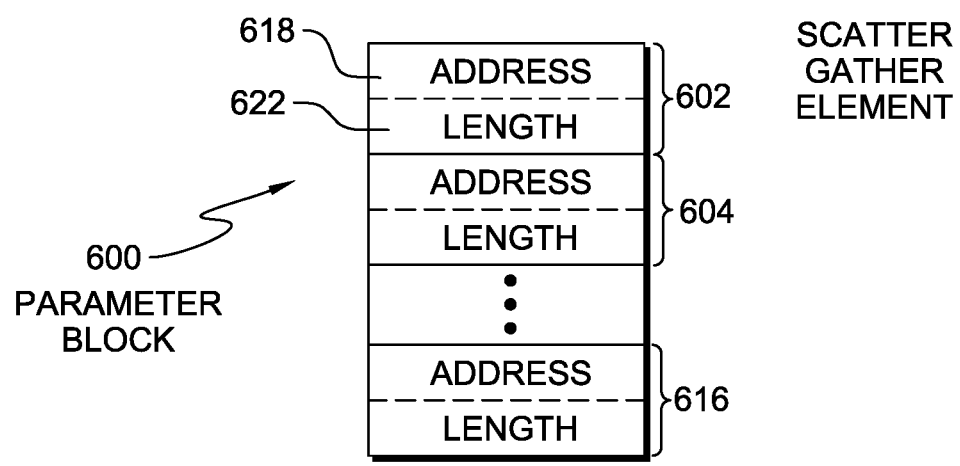
FIG. 6 is an exemplary block diagram illustrating a parameter block comprising a scatter/gather list within a data transfer command in accordance with an illustrative embodiment.

FIG. 6 is an exemplary block diagram illustrating a parameter block comprising a scatter/gather list within a data transfer command in accordance with an illustrative embodiment. As illustrated in FIG. 6, host driver 332 may format parameter block 600 within the data transfer command as a scatter/gather list comprising a plurality of scatter/gather elements 602, 604, and 616, each of which includes an address field 618 identifying the Logical Block Address (LBA) of the location on a storage device 340 to/from which the data in an I/O request to be transferred and a length field 622 indicating the amount of data that should be transferred to/from the specified LBA. It should be noted that each scatter/gather element represents an individual I/O request. For example, element 602 may contain information related to I/O request $R_1$ 506, element 604 may contain information related to I/O request $R_2$ 508, and element 616 may contain information related to I/O request $R_8$ 520. Moreover, address fields 618 of parameter block 600 correspond to I/O request addresses in virtual memory 504 which may not be contiguous, as shown in FIG. 5.

Figure 7:
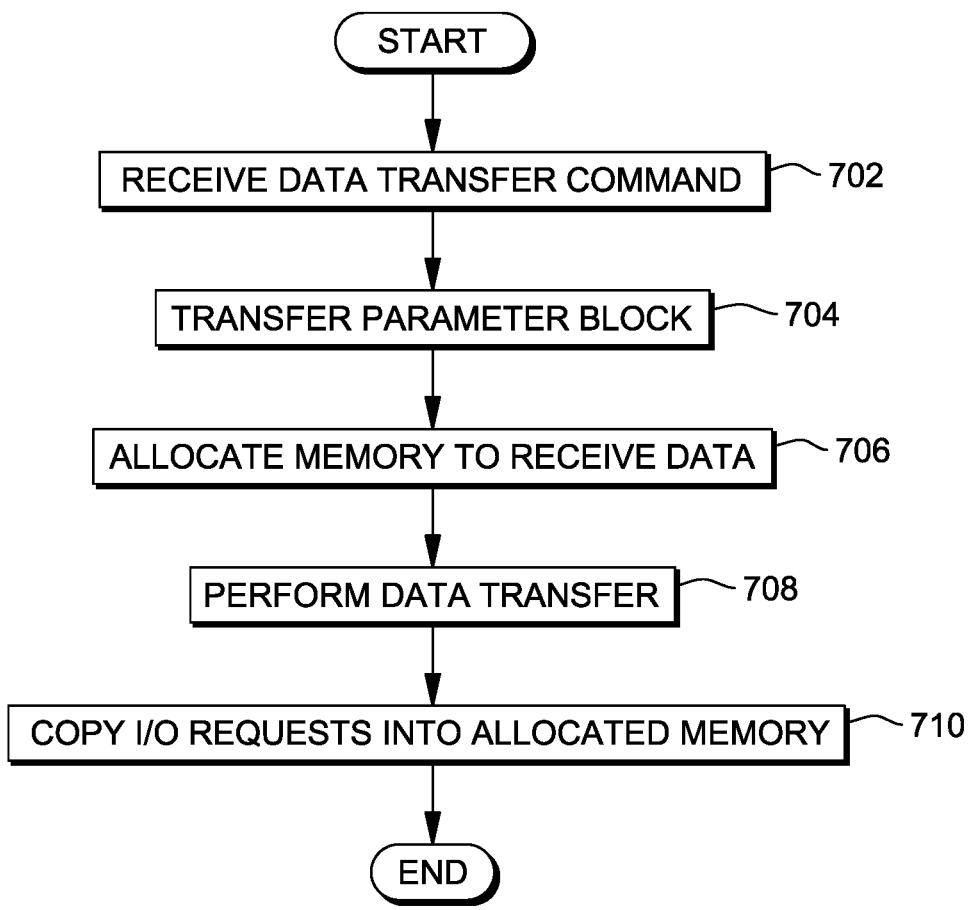
FIG. 7 is a flowchart of a method for processing an exemplary data transfer command containing a plurality of I/O requests performed by a target driver in accordance with an illustrative embodiment.

As previously indicated, at 416, host driver 332 sends the command generated in 414 to target driver 324. FIG. 7 is a flowchart of a method for processing an exemplary data transfer command containing a plurality of I/O requests performed by target driver 324 in accordance with an illustrative embodiment. In this embodiment, target driver 324 is designed to process a scatter/gather list. Those skilled in the art will recognize that a variety of well-known design choices are available to implement a scatter/gather list processor. FIG. 7 illustrates how target driver 324 may process a new SCSI WRITE command. While the flowchart of FIG. 7 will be described in reference to a new SCSI WRITE command, those skilled in the art will recognize that a new SCSI READ command can be processed in a similar manner. At 702, target driver 324 receives the data transfer command as, for instance, SCSI write PDU 144. Based on the PDU length field 202, target driver 324 may determine the length of the parameter block 600. At 704, target driver 324 performs a transfer of the parameter block 600. At 706, target driver 324 allocates a block of a memory to receive the data to be transferred based on information contained in the parameter block 600. At 708, target driver 324 performs a transfer of command specific user data. At 710, target driver 324 performs data transfer operations for individual I/O requests stored in the parameter data block in accordance with the entries in the scatter/gather list. As shown in FIG. 6, each scatter/gather element describes the location and the amount of data to copy. This embodiment enables target driver 324 to service a plurality of I/O requests by processing a single data transfer command.

Figure 8:
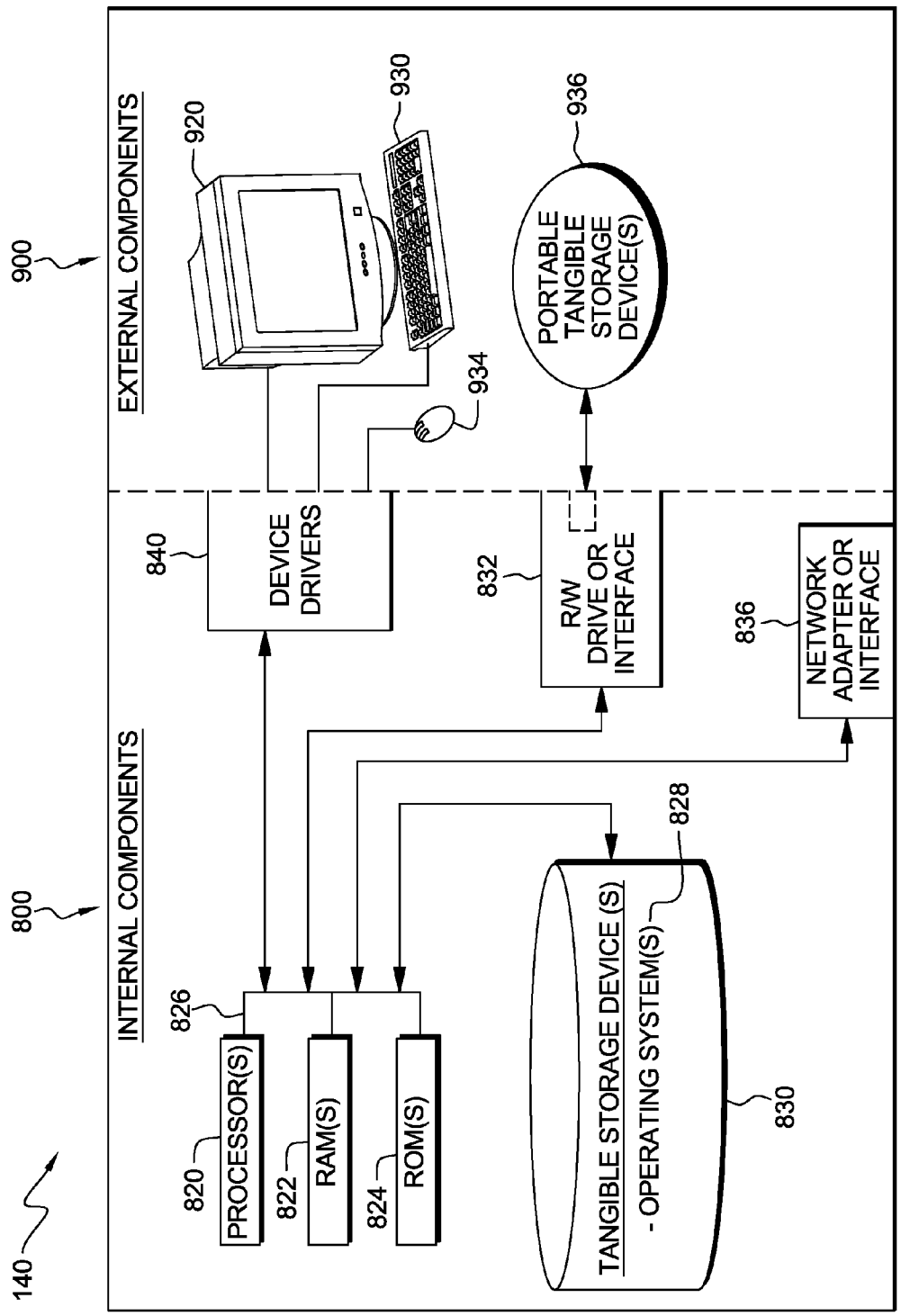
FIG. 8 illustrates internal and external components of a host server computer in accordance with an illustrative embodiment.

FIG. 8 illustrates internal and external components of host server computer 140 in accordance with an illustrative embodiment. Host server computer 140 includes internal components 800 and external components 900. Internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828, applications 330, and host driver 332 are stored on one or more of the computer-readable tangible storage devices 830 for execution by one or more of the processors 820 via one or more of the RAMs 822 (which typically include cache memory). In the embodiment illustrated in FIG. 8, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Internal components 800 also include a R/W drive or interface 832 to read from and write to one or more portable computer-readable tangible storage devices 936 such as a CD-ROM, DVD, memory stick, magnetic tape, magnetic disk, optical disk or semiconductor storage device. Host driver 332 can be stored on one or more of the portable computer-readable tangible storage devices 936, read via R/W drive or interface 832 and loaded into one or more computer-readable tangible storage devices 830.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring back to FIG. 8, internal components 800 also include a network adapter or interface 836 such as a TCP/IP adapter card. Host driver 332 can be downloaded to host computer sever 140 from an external computer via a network (for example, the Internet, a local area network or other, wide area network) and network adapter or interface 836. From the network adapter or interface 836, host driver 332 is loaded into one or more computer-readable tangible storage devices 830. The network may comprise copper wires, optical fibers, wireless transmission, routers, firewalls, switches, gateway computers and/or edge servers.

External components 900 include a computer display monitor 920, a keyboard 930, and a computer mouse 934. Internal components 800 also include device drivers 840 to interface to computer display monitor 920, keyboard 930 and computer mouse 934. The device drivers 840, R/W drive or interface 832 and network adapter or interface 836 comprise hardware and software (stored in one or more computer-readable tangible storage devices 830 and/or one or more computer-readable ROMs 824).

Host driver 332 can be written in various programming languages including low-level, high-level, object-oriented or non object-oriented languages. Alternatively, the functions of host driver 332 can be implemented in whole or in part by computer circuits and other hardware (not shown).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for optimizing performance of a storage system, the method comprising:
   a first processor receiving a plurality of I/O requests;
   the first processor generating a wait queue and assigning a plurality of small-sized I/O requests with the same logical unit number to the generated wait queue, wherein each I/O request within the plurality of small-sized I/O requests assigned to the generated wait queue is less than a pre-determined size;
   the first processor selecting a subset of the plurality of I/O requests from the generated wait queue, wherein the size of each I/O request of the selected subset of the plurality of I/O requests is less than the predetermined size, and wherein the combined size of each I/O request of the selected subset of the plurality of I/O requests is greater than the predetermined size;
   the first processor generating a data transfer command based on the selected subset of the plurality of I/O requests assigned to the generated wait queue being greater than the predetermined size, wherein the data transfer command is a new single data transfer command generated by combining multiple I/O requests with the same logical unit number and combining a plurality of data associated with each I/O request of the selected subset into a single data packet along with a parameter block embedded within the new single data transfer command, wherein the embedded parameter block is formatted within the new single data transfer command as a scatter/gather list comprising a plurality of scatter/gather elements; and
   the first processor transmitting the data transfer command to a second processor.

2. The method of claim 1, wherein the data transfer command is a Small Computer System Interface (SCSI) command.

3. The method of claim 1, wherein the plurality of I/O requests have non-contiguous virtual addresses.

4. The method of claim 1, wherein the first processor generating the data transfer command further comprises the first processor determining a size of data to be transferred via the data transfer command.

5. The method of claim 1, wherein the single logical unit number is associated with a single storage device.

* * * * *